(12) United States Patent
Shaw (10) Patent No.: US 6,618,825 B1
(45) Date of Patent: Sep. 9, 2003

(54) HIERARCHY OF FAULT ISOLATION TIMERS

(75) Inventor: Mark Shaw, Dallas, TX (US)

(73) Assignee: Hewlett Packard Development Company, L.P., Houston, TX (US)

(*) Notice: Subject to any disclaimer, the term of this patent is extended or adjusted under 35 U.S.C. 154(b) by 0 days.

(21) Appl. No.: 09/553,587

(22) Filed: Apr. 20, 2000

(51) Int. Cl.$^7$ ................................................ G06F 11/30
(52) U.S. Cl. ...................................... 714/55; 714/48
(58) Field of Search ............................. 714/51, 55, 48

(56) References Cited

U.S. PATENT DOCUMENTS

| | | | | |
|---|---|---|---|---|
| 5,113,504 A | * | 5/1992 | Matsuda | 714/23 |
| 5,841,969 A | * | 11/1998 | Fye | 714/56 |
| 5,898,829 A | * | 4/1999 | Morikawa | 714/47 |
| 6,269,478 B1 | * | 7/2001 | Lautenbach-Lampe et al. | 717/127 |
| 6,360,333 B1 | * | 3/2002 | Jansen et al. | 714/25 |
| 6,487,680 B1 | * | 11/2002 | Skazinski et al. | 714/23 |

FOREIGN PATENT DOCUMENTS

JP          2001350651 A1  *  12/2001

* cited by examiner

*Primary Examiner*—Scott Baderman
*Assistant Examiner*—Joshua Lohn (57) ABSTRACT

In the present invention, a coordinated hierarchy of timing mechanisms preferably cooperate to report errors at different operational levels of a complex of computing devices. Preferably, each timer is able to identify a failure condition at its own level of operation and transmit a time-out condition to a higher level device which may also be a timer. Upon generation of a time-out condition, a system component experiencing a fault condition preferably continues to operate in a degraded mode, informs devices attempting to communicate with the faulty component of a status of the fault condition, and preferably proceeds to identify and correct a failure which caused the time out condition. The timers may be implemented in hardware or software.

20 Claims, 6 Drawing Sheets

HIERARCHY OF FAULT ISOLATION TIMERS

BACKGROUND

In computer systems which include a plurality of processors and associated peripheral equipment, a mechanism is generally implemented to track the status of requests and responses transmitted throughout a network or complex of such processors and other equipment. This mechanism is generally implemented so that when a request for data is sent, a time limit is imposed on satisfaction of the request by a CPU (Central Processing Unit) based counter. If the request is not satisfied within the time limit, a counter generally times out thereby triggering a high priority machine check which causes the computer network or complex to shut down, and initiating execution of recovery code by the CPU. Generally, the counter starts timing when a request for a transaction wins arbitration and is placed on a bus toward a designated destination within the network or complex. The counter will generally stop either upon successful completion of the task being timed by the counter or upon expiration of the designated time period.

One problem with the above time-out mechanism is that a time out condition generally forces an entire network or complex of connected CPUs, to crash and lose all data associated with the system state in existence prior to the crash. In this situation, system recovery may be accomplished only at a very basic stage with much valuable data having been irretrievably lost due to the time out condition. Furthermore, the centralization of timer operation in the CPU leaves little data with which to identify a source or cause of the error which caused the time out condition. Accordingly, re-occurrence of the event causing the time out may be difficult to prevent.

In another prior art system, timers are added to various system chips in communication with CPUs within a complex of CPUs. Generally, when a time-out condition occurs in such a system chip, a state of the system chip which timed out, at the point in time when the time-out occurred, may be obtained, thereby providing information which may help to identify the cause of the failed transaction leading to the time-out condition. This approach generally provides more guidance in debugging a failure leading to a time out condition than systems employing only CPU-based timers. However, even with implementation of system chip based timers, a time-out condition will generally cause the entire network of computers to crash and lose all information associated with the machine state in existence just prior to the time-out condition. Accordingly, only a very basic recovery operation is available. And, as was the case with the previously discussed CPU-based timer approach, much data is irretrievably lost in upon occurrence of a time-out condition.

Another prior art approach involves implementation of a scalable coherent interface (SCI). SCI includes a networking protocol for retrying certain transactions upon expiration of timers associated with timed transactions. Therefore, instead of crashing the system upon timing out a first time, deployment of SCI protocol may be employed to retry transmission of a request for a which a response was not received in a timely manner. Thus, when a counter times out, the counter may be initialized to zero, the associated request re-transmitted, and the timer enabled to time the retried transaction. This approach may enable certain time out conditions to be avoided where a failure was caused by transient effects with the overall network or complex which do not reoccur during a retried transaction. However, certain problems associated with earlier mentioned approaches remain. Specifically, upon occurrence of a final time-out (for a transaction which will not be retried), the system will generally crash, and data associated with the machine state prior to the crash will generally be irretrievably lost. Accordingly, only a very basic recovery operation will be available.

The timing mechanisms employed in the prior art are generally neither synchronized nor coordinated with each other. Furthermore, the timing mechanisms are generally thinly scattered over a large number of devices, whether the timers are located exclusively in CPUs or are located in a combination of CPUs and system chips, such as memory and input/output (I/O) controllers. Accordingly, a fault in an area of a computer network or complex may go undetected until the problem is substantial enough to cause a widespread system shutdown.

Generally, in prior art systems employing timers distributed among various system chips, the timers generally have closely spaced time-out values. Accordingly, when a fault is encountered, a plurality of different timers may time out asynchronously in close temporal proximity to each other thereby causing the overall system to crash and making subsequent identification of the problem leading to the system crash very difficult. It is further noted that in the prior art systems described above, a time out condition in one CPU or in one system chip may cause an entire complex of CPUs and associated system chips to fail or crash, thereby enabling a failure in 1% of a complex to disrupt operation of 100% of the complex.

Therefore, it is a problem in the art that the machine state of a computer system is lost upon occurrence of a time out condition.

It is a further problem in the art that only a very limited recovery operation is possible after occurrence of a time-out condition.

It is a still further problem in the art that identifying the timer whose expiration caused a system crash may be very difficult in the systems of the prior art.

It is a still further problem in the art that a transaction failure and associated time out condition in one chip of a complex may cause the entire complex to crash or fail.

SUMMARY OF THE INVENTION

These and other objects, features and technical advantages are achieved by a system and method which deploys timers within devices in a distributed manner throughout a system or complex which includes CPUs and associated system chips, where the timers have a hierarchy of time-out values, and where the timers are able to independently experience time-out conditions generating a localized failure condition while enabling a remainder of the complex to continue operating. Preferably, a chip, device, or sub-system affected by the time-out or other error condition continues operating in a degraded or safety mode and communicates its condition to other chips and sub-systems so that the rest of the complex may continue operating while preferably bypassing the chip, device, or sub-system affected by the time-out condition.

The various timing operations preferably operate within a coordinated hierarchical structure wherein each timer monitors an operation occurring below its own level in a hierarchy while also being monitored by a device (which may be a timer) at a higher level in the hierarchy, where the higher level device (whether timer, CPU or other device) is generally able to monitor the timers below its level for a time period exceeding the time-out value of the timer being so monitored. In this manner, a time-out condition of a timer at one level in the hierarchy may be detected at the next higher level in the hierarchy thereby enabling the higher level device to respond to a time-out condition in a predetermined and controlled manner, thereby enabling the higher level device to preserve its own data, preserve control over its own operation and beneficially isolate the error condition to the lower level device or system, thereby avoiding a shutdown of an entire complex or system.

Since the equipment affected by a time-out condition preferably continues operating, albeit in a degraded mode, during the time-out, and the rest of the complex may continue operating substantially normally, the complex is preferably able to preserve system state information which existed prior to the time-out condition and to continue processing information associated with the system state. Moreover, since the chip or device affected by the time-out continues operating after the time-out, and is able to communicate its condition to other chips and/or devices in communication with the chip or device which has timed out, information pertaining to the cause of the time-out condition may be effectively gathered by the complex, thereby preferably aiding a subsequent debugging process.

In a preferred embodiment, a plurality of timers associated with various chips, devices, and sub-systems throughout a complex of connected CPUs operate independently of one another enabling most timers within the complex to continue operating unhindered even while one timer within the complex experiences a time-out condition. Depending upon the severity of the condition of the malfunctioning (timed out) device or sub-system, the malfunctioning device may operate to isolate itself from communication with other systems within the complex by responding to communication messages from other devices with a message indicating that a fault condition exists. In this manner, the inventive mechanism preferably operates to limit propagation of any error or fault condition to systems or devices which did not experience a time-out condition.

In a preferred embodiment, a hierarchy of time-out periods may be established for a range of possible transactions within the complex of connected CPUs. The implementation of a hierarchy of time-out periods preferably avoids having a plurality of different timers time out simultaneously. Generally, whenever a timer at one level of the hierarchy experiences a time-out condition, other timers within the complex will preferably continue operating and simultaneous time-outs may thereby be avoided. Preferably, the devices associated with counters at various levels of the time-out value hierarchy are notified of a time-out condition occurring in connection with a device or transaction at a lower ranking level of the hierarchy. Preferably, after a timer times out, the timer or other device monitoring the timed-out timer halts its timing operation in a controlled manner without timing out. A device (whether timer or other device) monitoring a timed out timer, may alternatively continue its timing operation.

In a preferred embodiment, recovery code is generally executed in response to a time-out condition. Time-out thresholds may be selected based on factors including the nature of a device initiating a transaction within the system or complex, and the nature of the transaction being conducted. Accordingly, recovery code to be executed in response to a time-out condition may be customized to suit the particular device and the particular transaction associated with the applicable time-out condition.

Therefore, it is an advantage of a preferred embodiment of the present invention that the overall system or complex may continue operating after occurrence of a time-out condition within the complex.

It is a further advantage of a preferred embodiment of the present invention that system data is generally preserved during a time-out condition, and recovery from the condition may be accomplished through execution of appropriate recovery code.

It is a still further advantage of a preferred embodiment of the present invention that a location of a failure associated with a time-out condition is readily identifiable.

It is a still further advantage of a preferred embodiment of the present invention that generally only one time-out condition will arise in connection with one operating error, thereby avoiding the confusion arising from having a number of simultaneous time-out conditions.

It is a still further advantage of a preferred embodiment of the present invention that recovery code to be executed in response to a particular time-out condition may be tailored to suit a device and/or a transaction associated with the time-out condition.

It is a still further advantage of a preferred embodiment of the present invention that the complex or system may continue operating after occurrence of a time-out condition.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
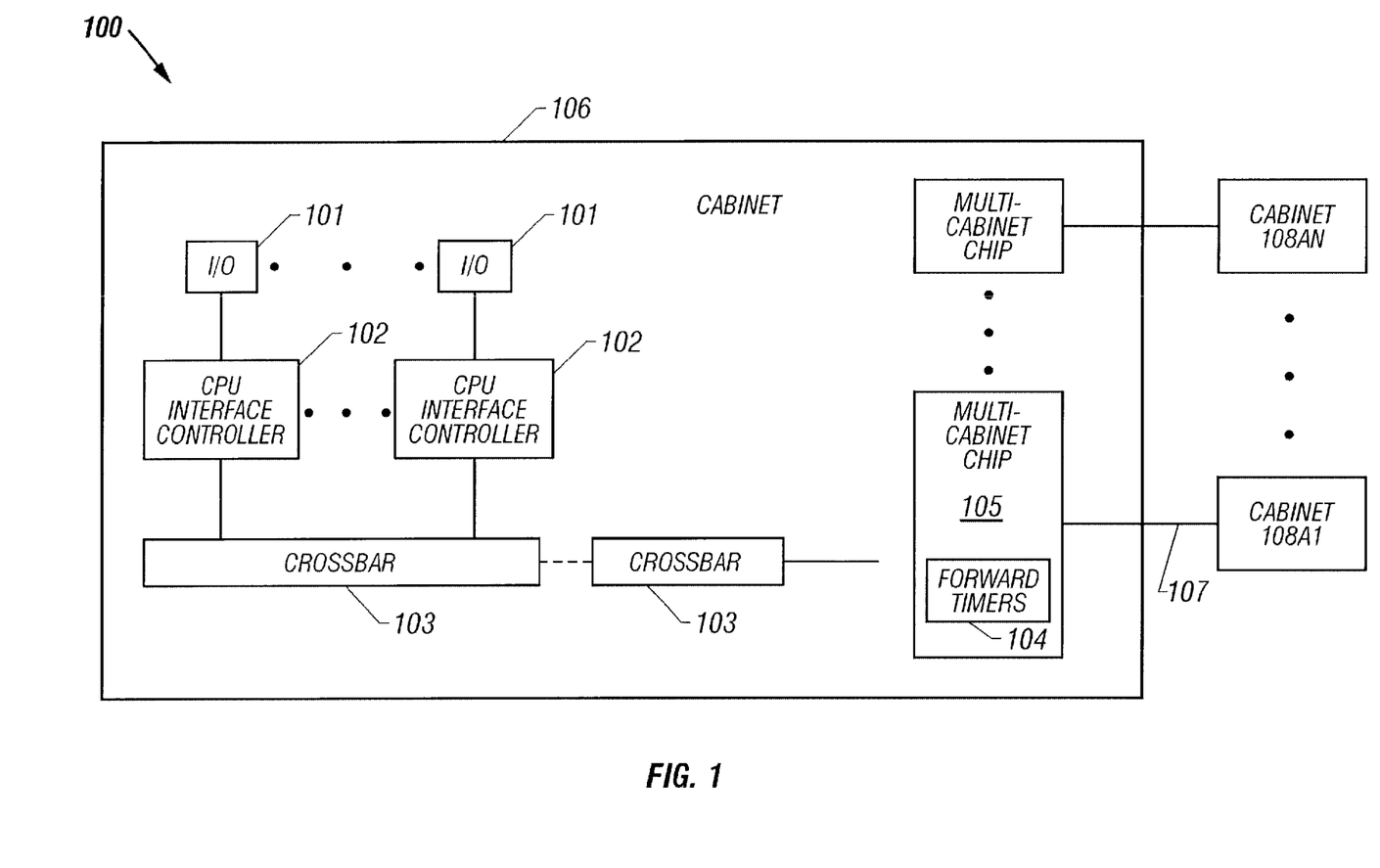
FIG. 1 depicts an operational building block of a complex of computers according to a preferred embodiment of the present invention.

FIG. 1 depicts an operational building block of a complex of computers according to a preferred embodiment of the present invention. The operational building block depicted in the particular embodiment of FIG. 1 is a cabinet 106. It will be appreciated that the timing and failure isolation mechanism of the present invention may be implemented employing a range of system configurations and is not limited to deployment according to FIG. 1.

In a preferred embodiment, cabinets such as cabinet 106 may be employed as modular building blocks of an overall complex of computers. Cabinet 106 preferably includes multi-cabinet chip 105 which provides for a robust communication interface capable of conducting bi-directional communication with other like cabinets, such as cabinets 108A1 through 108AN, over cables, such as cable 107, as much as thirty feet in length. Cabinet 106 may be connected to any number of other cabinets employing a multi-cabinet chip, such as multi-cabinet chip 105, for each such connection.

In a preferred embodiment, cabinet 106 includes one or more crossbars 103 for allowing various CPUs and various other system devices to communicate with each other. Crossbar 103 is preferably a point to point networking switch. As shown in FIG. 1, there may be a plurality of instantiations of crossbar 103 in cabinet 106. Moreover, each instantiation of crossbar 103 may permit connection of a plurality of system devices. An exemplary connection of system devices to crossbar 103 may include an I/O subsystem 101 and a CPU control or CPU interface controller 102. It is noted that CPU interface controller 102 is preferably substantially the same device depicted by element 200 in FIG. 2.

Multi-cabinet chip 105 preferably includes five forward timers 104 for monitoring the progress of requests transmitted to other cabinets over cable or link 107. It will be appreciated that fewer or more than five timers may be included within forward timers 104, while remaining within the scope of the present invention. The timers 104 are preferably employed to detect whether cabinets connected to multi-cabinet chip 105 are properly processing transactions transferred from multi-cabinet chip 105. Where timers 104 detect a communication failure between cabinet 106 and another cabinet, cabinet 106 preferably identifies the cabinet experiencing the failure, logs the failure condition, and discontinues communication with the identified cabinet until an indication is provided that the identified cabinet is operating properly.

Figure 2:
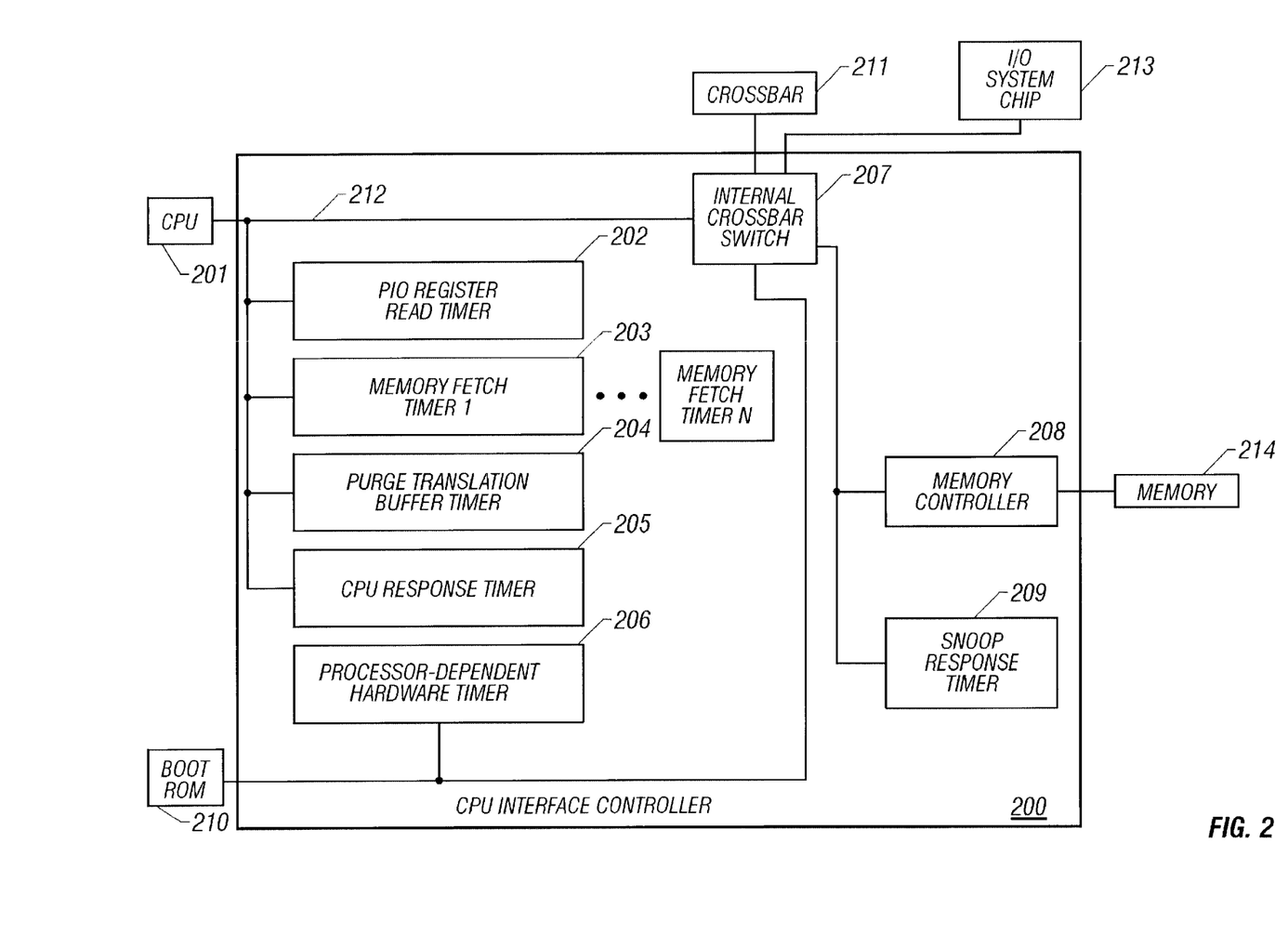
FIG. 2 depicts a CPU controller interface according to a preferred embodiment of the present invention.

FIG. 2 depicts a CPU interface controller 200 according to a preferred embodiment of the present invention. It is noted that CPU interface controller 200 is a more detailed representation of a CPU interface controller 102 depicted in FIG. 1. CPU interface controller 200 preferably includes timers for monitoring a plurality of separate activities associated with the operation of CPU 201.

In a preferred embodiment, a main bus 212 links CPU 201 and a plurality of timers to internal crossbar switch 207, which is preferably a point to point switch. Crossbar switch 207 preferably operates as a communication interface both between devices internal to CPU interface controller 200 and between CPU interface controller 200 and external devices. For purposes of communication with devices external to controller 200, internal crossbar switch 207 is in communication with crossbar 211 which is external to controller 200. Crossbar 211 is preferably substantially equivalent to one of the instantiations of crossbar 103 depicted in FIG. 1.

In a preferred embodiment, a timer operates to track a designated transaction and perform selected operations based upon the progress of that transaction. A description of a typical set of events in a timing operation follows. It will be appreciated that the number, sequence, and nature of these events may vary, and that all such variations are within the scope of the present invention.

In a preferred embodiment, a timer preferably begins marking the passage of time associated with a selected transaction upon occurrence of a specific event, such as the transmission of a request from a particular device. Each timer generally has a threshold time value associated with a transaction after the expiration of which, the pertinent timer will fire, or time out, thereby indicating that a failure has occurred. The timer measuring time associated with a transaction is referred to herein as the "monitoring timer" for that transaction. It is noted that a timer monitoring a transaction may in turn be monitored by another timer or by a device other than a timer, such as, for instance, a CPU.

In a preferred embodiment, each timer is associated with a particular transaction. In an alternative embodiment however, a timing mechanism may be configured to monitor a plurality of different transactions and to establish different thresholds for different transactions. Furthermore, a particular transaction may optionally be monitored by more than one timing mechanism, and all such variations are within the scope of the present invention.

In an exemplary case of timer operation, a timer begins counting upon the initiation of a transaction. Several events are possible from that point forward as discussed in the following. Where a transaction is successfully completed before the expiration of the time-out threshold for the transaction, the monitoring timer preferably concludes counting in a controlled manner and preferably reports the successful completion of the monitored transaction to a higher level device, which may be a CPU. Where the transaction has not been completed after expiration of the designated time-out period, the monitoring timer times out, or "fires," thereby indicating that an error condition has arisen. The time-out condition of the monitoring timer is preferably reported to the previously mentioned higher level device.

Yet another event is possible depending upon the nature of the transaction being monitored. In the present invention, a hierarchy of timers may be implemented wherein a timer may monitor a transaction which requires a subordinate transaction which subordinate transaction is timed separately from the higher level transaction. Any number of levels of subordination are possible, and timers may be implemented at each such level to monitor the progress of the various transactions. Where a subordinate transaction times out, the time-out condition is preferably reported to a monitoring timer. This monitoring device will preferably cease counting in a controlled manner. Therefore, in this case, the monitoring timer does not "time out." Generally, the monitoring timer, having stopped counting, will report to a higher level device that an error has occurred at a subordinate level making completion of the monitored transaction impossible. Appropriate remedial action may then be undertaken in a controlled manner by all levels in the hierarchy above the level at which the time-out condition occurred. In this manner, a failure may be effectively isolated, a system crash may be avoided, the system state may be effectively preserved, and the identity of the device experiencing a failure may generally be readily identified.

In a preferred embodiment, CPU 201 includes at least one timer separate from those timers depicted within CPU interface controller 200. CPU interface controller 200 preferably includes the timers discussed in the following. PIO (processor input/output) register read timer 202 preferably conducts timing operations for register read and register write operations. Memory fetch timer 203 preferably operates to time data acquisition operations from memory, where the data may be located on the immediate CPU interface controller 200 or at a remote location. There may be multiple instances of memory fetch timer 203 as indicated in FIG. 2.

In a preferred embodiment, CPU interface controller 200 includes purge translation buffer timer 204 for timing operations involving the translation of virtual memory into physical memory. CPU response timer 205 is preferably employed to ensure that for transactions sent to CPU 201 from controller 200 receive a timely response. Because the CPU 201 is readily accessible to CPU interface controller 200, replies from CPU 201 are expected to be received rapidly, and timer 205 is accordingly assigned a relatively low time-out value.

In a preferred embodiment, CPU interface controller 200 includes processor-dependent hardware (PDH) timer 206 which is preferably employed to time transactions conducted between CPU interface controller 200 and Boot ROM 206 and between controller 200 and a real-time clock (not shown). It will be appreciated that CPU interface controller 200 may include fewer or more timers than those listed above, and may include timers monitoring different transactions having different physical devices as sources and destinations of the transactions than those listed above, and that all such variations are included in the scope of the present invention.

In a preferred embodiment, CPU interface controller 200 further includes memory controller 208 in communication with internal crossbar switch 207 for brokering requests for data which may reside either in local memory 214 or at a remote location in a complex of computers to which interface controller 200 is connected. Memory controller 208 preferably employs a system of memory tags to indicate where particular data is stored, whether locally in memory 214, or at a remote location.

In a preferred embodiment, snoop response timers 209 preferably operate to monitor or time memory fetch operations which seek data located at remote locations, which remote locations may include remotely located CPU interface controllers similar to local CPU interface controller 200. In a preferred embodiment, there are 64 snoop response timers 209. It will be appreciated however, that fewer or more than 64 snoop response timers 209 may be employed, and all such variations are included within the scope of the present invention. Preferably, each timer within snoop timers 209 is associated with an ordered access queue (OAQ) entry. Preferably, memory requests from CPU 101 are processed by memory controller 208 and placed in the ordered access queue. Preferably, the ordered access queue thereafter tracks the state of memory transactions initiated by CPU 101.

Figure 2A:
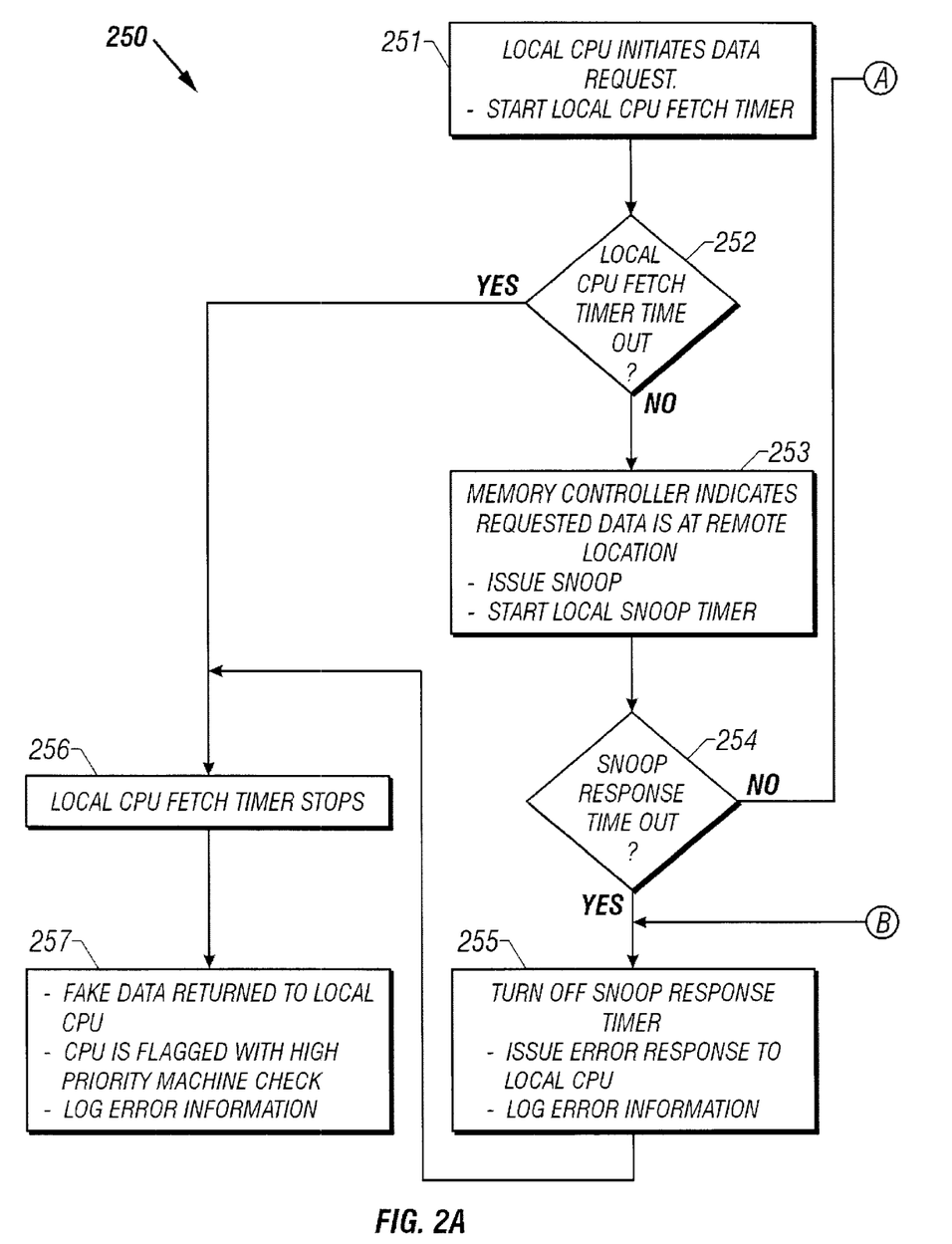
FIGS. 2A and 2B depict a flowchart of an example of system activity in response to a CPU data request according to a preferred embodiment of the present invention.
Figure 2B:
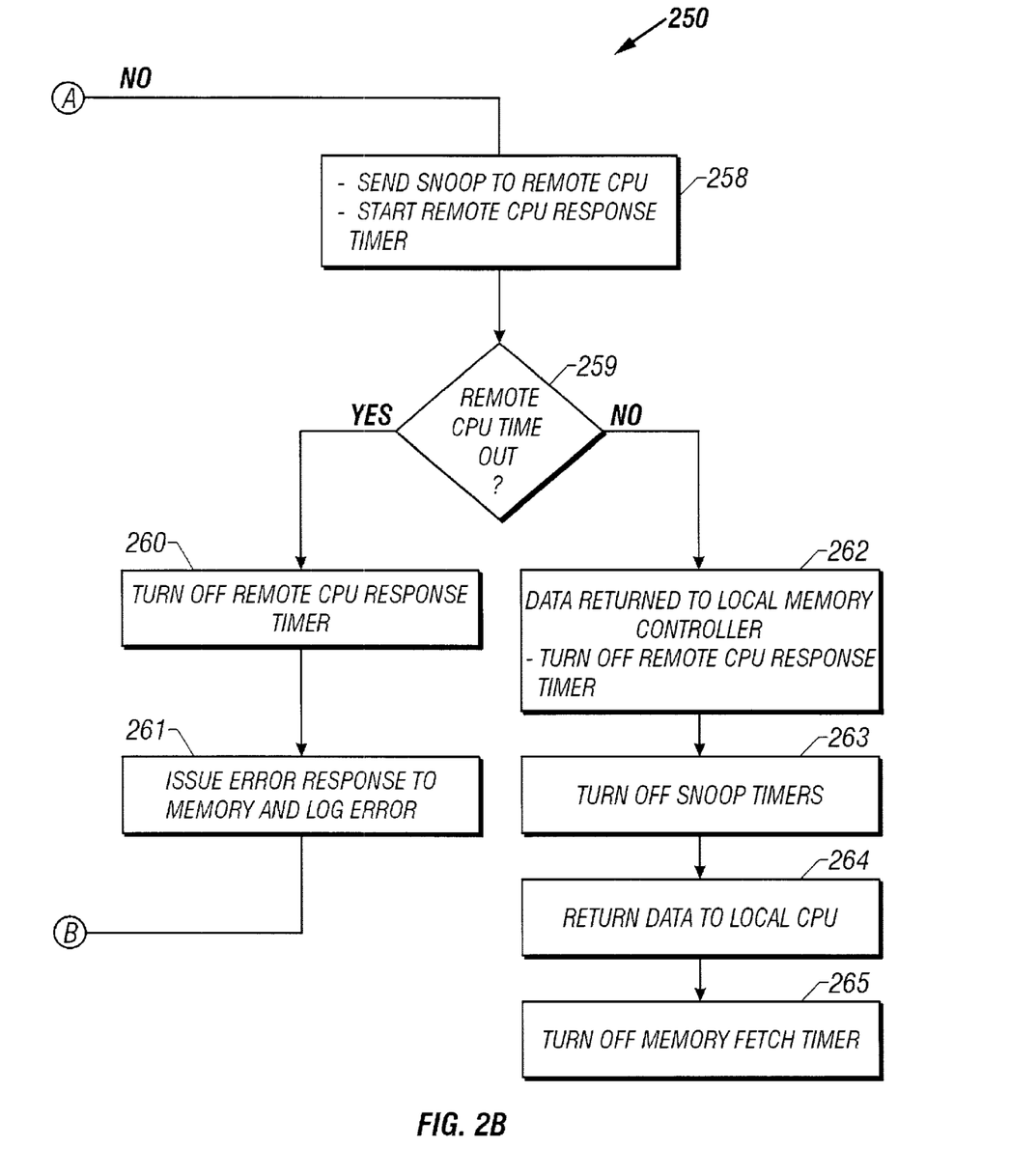

FIGS. 2A and 2B depict a flowchart of a sequence 250 representing an example of system activity in response to a CPU data request according to a preferred embodiment of the present invention. The following discussion is intended to illustrate the operation of a coordinated hierarchical timer operation mechanism of the present invention using a memory fetch request as an exemplary transaction. It will be appreciated that a number of other transactions may be tracked employing a number of different timer arrangements and hierarchies, and all such variations are included within the scope of the present invention. In the following, a memory fetch is requested by one CPU and is serviced at a site in a computer complex remote from the requesting CPU. In the following, the requesting CPU is generally referred as the "local CPU" and the CPU located remotely from the requesting CPU is referred to as the "remote CPU." Reference is made to FIGS. 2A and 2B in connection with the described method steps and to FIG. 2 in connection with selected devices for performing the identified method steps.

For the sake of discussion, the following discussion assumes that the remote CPU and associated (remote) CPU interface controller are arranged much like local CPU 201 and local CPU interface controller 200. In order to distinguish between elements of the remote and local devices the designation 201' will be used instead of 201 to refer to the remote CPU. Apostrophes will be similarly appended to the reference numerals for other devices at the remote location which are analogous to devices identified in FIG. 2.

At step 251, local CPU 201 initiates a data request, thereby causing fetch timer 203 within local CPU interface controller 200 to begin counting. Therefore, at this point in sequence 250, preferably only one counter 203 is actively counting. At step 252, a decision block preferably identifies a query to determine whether counter 203 has timed out or not. Timer 203's time-out period is preferably set to a level which takes account of the possibility that data may need to be acquired from a remote location in the complex (not shown). Since this discussion presents events in substantially chronological order, fetch timer 203 should not time out at the present stage of sequence 250. It will be appreciated that decision block 251 could time out at any processing phase of sequence 250 and is not limited to generating a final time-out decision in between steps 251 and 253. All timers in the inventive system, timer 203 included, preferably have time-out values which are exceeded only when malfunctions occur in the processing of the transactions being monitored by the various timers.

Assuming that timer 203 has not timed out, at step 253, memory controller 208 (FIG. 2) preferably determines that the data requested by CPU 201 is present at a remote location rather than in memory 214. Accordingly, memory controller 208 preferably issues a snoop. Herein a "snoop" generally refers to a request to locate desired data at one or more remote locations within the complex of computers (not shown) of which CPU interface controller 200 is a part. In conjunction with issuing a snoop, a local snoop response timer among timers 209 preferably starts counting in order to monitor the progress of the snoop operation. It will be noted that as of step 254, two counters are preferably active in sequence 250: specifically, fetch timer 203 and snoop timer 209.

At decision block 254, a determination is made as to whether snoop response timer 209 has timed out. The immediately following discussion assumes that the answer to decision block 254 is no. It will be appreciated that timer 209, as with other timers employed in sequence 250, may time out at any point in the sequence depending upon the time-out period of the particular transaction being timed, and is not limited to issuing a decision only at the point in the sequence at which the decision block is depicted.

Continuing at step 258, a snoop is preferably sent to a remote CPU in order to locate the desired data, thereby initiating counting by a remote CPU response timer.

Continuing with the example, decision block 259 presents a query pertaining to whether remote CPU response timer 205' has timed out. It is assumed in the immediately following discussion that timer 205' has not timed out. Where no time-outs have occurred, it is noted that at the current phase of sequence 250, preferably three timers, 203, 209, and 205' are now actively monitoring the progress of their respective transactions. It will be appreciated that fewer or more than three counters may be active at any given moment in the inventive mechanism, and all such variations are included within the scope of the present invention.

Continuing with the example at step 262, where the remote CPU response timer 205' has not timed out, the requested data is preferably transmitted from the remote location (not shown) to local memory controller 214. Since remote CPU 201' has responded, remote CPU response timer 205' is preferably turned off at step 262. Similarly, upon receiving the desired data at memory controller 208, snoop timer 209, which was monitoring the snoop for data at the remote site, is preferably turned off at step 263. The desired data is then preferably provided to CPU 201 at step 264, thereby causing memory fetch timer 203 to turn off at step 265.

In a preferred embodiment, the expiration of the defined period for any timer triggers a pre-defined sequence of events which operate to discontinue the timed-out transaction and issues an error response to a device monitoring the expired timer. The device monitoring an expired timer is generally considered to be "above" the expired timer in the hierarchical scheme of the present invention and may be another timer or any one of a number of other devices (such as a CPU, memory controller, I/O system etc. . . . ) in the complex. Where a timer is monitoring a timer which has timed out, the timing operation in the monitoring timer is preferably brought to a controlled stop. The monitoring timer is thereby preferably prevented from timing out.

In the example depicted in FIGS. 2A and 2B, up to three separate timers may be counting at a given moment. The preferred system responses to time-outs in each of the timers follows. Decision block 252 presents the possibility of expiration of local CPU fetch timer 203. If timer 203 times out, timer 203 stops counting as indicated in step 256. Generally, a time-out condition represents a forced stop in the counting operation as distinguished from a controlled stop which preferably occurs when a timer stops counting prior to occurrence of a time-out condition. Then, in step 257, fake data is preferably returned to CPU 101. This "fake data" is transmitted as a mechanism for continuing needed communication between timer 203 and CPU 201. The "fake data" preferably consists of a sequence of negative one values transmitted from timer 203 to CPU 201 in order to complete the CPU 201 request, thereby preventing the CPU timer from firing, or timing out. It will be appreciated that other "fake data" codes could be employed and remain within the scope of the present invention.

Continuing with step 257, timer 203 also preferably flags CPU 101 with a high priority machine check thereby preferably causing CPU 201 to operate in a degraded mode, or "safety mode," until any continuing problem associated with the time-out condition is corrected. Preferably, operation of CPU 201 in "safety mode" causes diagnostic code to be executed. Timer 203 also preferably logs error information at timer 203 indicating that timer 203 has timed out. The step of logging error information within block 257 may log error information pertaining either to timer 203 timing out or to indicate that a timer which is lower in the timer hierarchy has timed out. Thus, "log error information" step of block 257 preferably varies in operation, as described above, depending upon whether timer 203 or a lower level timer has timed out. The "log error information" steps in blocks 255 and 261, respectively, similarly operate to indicate whether the timer immediately preceding the block containing the "log error information" step or a lower level timer has timed out.

In the exemplary sequence depicted in FIGS. 2A and 2B, among the three timers, 203, 209 and 205', there is a hierarchy in which timer 203 occupies the highest position of the three. It is noted that timer 203 is monitored by CPU 201 thereby preferably placing CPU 101 at the top of this exemplary hierarchy. Accordingly, time-out conditions in timers 209 and 205' which are at lower levels in the hierarchy than CPU 201 eventually feed information up the hierarchy toward timer 203 and CPU 101. Effectively, a breakdown in the sequence of events designed to deliver data to CPU 201 will prevent proper data delivery to CPU 201 and accordingly, a report of a failure condition at any point in the sequence of events preferably eventually reaches CPU 101. Accordingly, sequence 250 depicts the steps resulting from time-out conditions for timers 209 and 205' tying into steps 256 and 257 which result from a time-out of timer 203.

In the example depicted in FIGS. 2A and 2B, decision block 254 presents the possibility of snoop response timer 209 timing out or expiring. If snoop response timer 209 times out, the snoop response timer is forcibly turned off (as indicated in step 255). An error response is then preferably provided to CPU 101, and error information pertaining to the failure is preferably logged at timer 209 indicating that timer 209 timed out. Thereafter, timer 203 is preferably brought to a controlled stop in response to the time-out of timer 209. Then, step 257 is performed as previously described in connection with timer 203 time-out above with the exception of the "log error information" step. Where timer 209 or other timer below the level of CPU fetch timer 203 times out, the "log error information" step in block 257 logs error information at timer 203 which indicates that the error occurred at timer lower in the hierarchy than timer 203. In an alternative embodiment, the "log error information" step of blocks 255, 257, and 261 may be enabled to precisely identify which lower level timer timed out or expired.

Decision block 259 presents the possibility of remote CPU response timer 205' timing out. Upon timing out, timer 205' preferably stops counting in step 260. Preferably, in step 261, timer 205' issues an error response to memory controller 208 and logs an error at timer 205' indicating the existence of a time-out and the identity of the timer which timed out. Thereafter, the response to a time-out of timer 205' executes steps 255, 256, and 257 as described above. Where timer 205' has timed out, the "log error information" steps of blocks 255 and 257 preferably log the occurrence of a time-out condition and indicate that the expired timer is at a lower level in the hierarchy than timers 209 and 203, respectively.

In a preferred embodiment, the various timers depicted in sequence 250 are not synchronized. Furthermore, the time-out periods are preferably set to progressively lower values at lower levels of the previously discussed hierarchy. A hierarchical distribution of time-out values and a lack of timer synchronization preferably combine to prevent a plurality of timers from timing out, expiring, or "firing" simultaneously. Accordingly, preferably only one timer expires at a time when employing the mechanism of the present invention. Therefore, while the expiring timer (the timer experiencing a time-out) may experience a forced stop, the timers at higher levels in the hierarchy are able to operate in a controlled manner, preserve information regarding their own operation, and preferably acquire information regarding the cause of the failure causing the time-out. The inventive mechanism thereby preferably: enables the overall complex of computers to keep running, permits the system state to be preserved, and enables valuable debugging information to be acquired regarding the source of the time-out condition.

As indicated above, in a preferred embodiment, the equipment experiencing a failure indicated by a time-out condition may continue to operate in a degraded state. In the embodiment of FIG. 2, if any timer associated with CPU 201 or CPU interface controller 200 times out, the combination of CPU 201 and interface controller 200 will preferably operate in a degraded mode until the error is corrected. Moreover, interface controller 200 may inform other system chips that controller 200 will be out of communication for a period of time (a recovery period for controller 200) and allow other system chips and CPUs in the complex to operate unhindered during this recovery period. The inventive mechanism may thereby advantageously limit the amount of equipment which will function in a degraded mode during the recovery period to a single system chip, such as, for instance, CPU interface controller 200.

In the particular case of interface controller 200, the degraded mode operation generally may not be further restricted, such as, for instance to purge translation buffer 204. However, in other system chips, and/or in other embodiments of CPU interface controller 200, still further isolation of degraded mode operation in response to a time-out condition may be achieved. It will be appreciated that greater isolation of degraded mode operation in response to a failure condition is desirable because such isolation enables a greater proportion of an entire computing complex to operate unhindered during a period of recovery from a failure condition.

Although the above discussion concerns a hierarchically organized system response to localized time-out conditions designed to preserve overall system operation while isolating, to as great a degree as possible, the components of an overall computing complex which will operate in a degraded mode during a recovery period, it will be appreciated that the inventive mechanism is not limited to responding to time-out conditions but may be generally applied to failure conditions of any kind within a computing system. It will be further appreciated that the timing operations of the present invention may be implemented either in hardware, software, or a combination of the two. Furthermore, the various operational components referred to in this application including timers, memory controllers, and CPUs may be implemented employing a range of possible device integration. Specifically, the referenced components may be provided in separate integrated chip packages. Alternatively, one or more of the referenced operational components may be combined in a single integrated chip package, and all such variations are included within the scope of the present invention.

Figure 3:
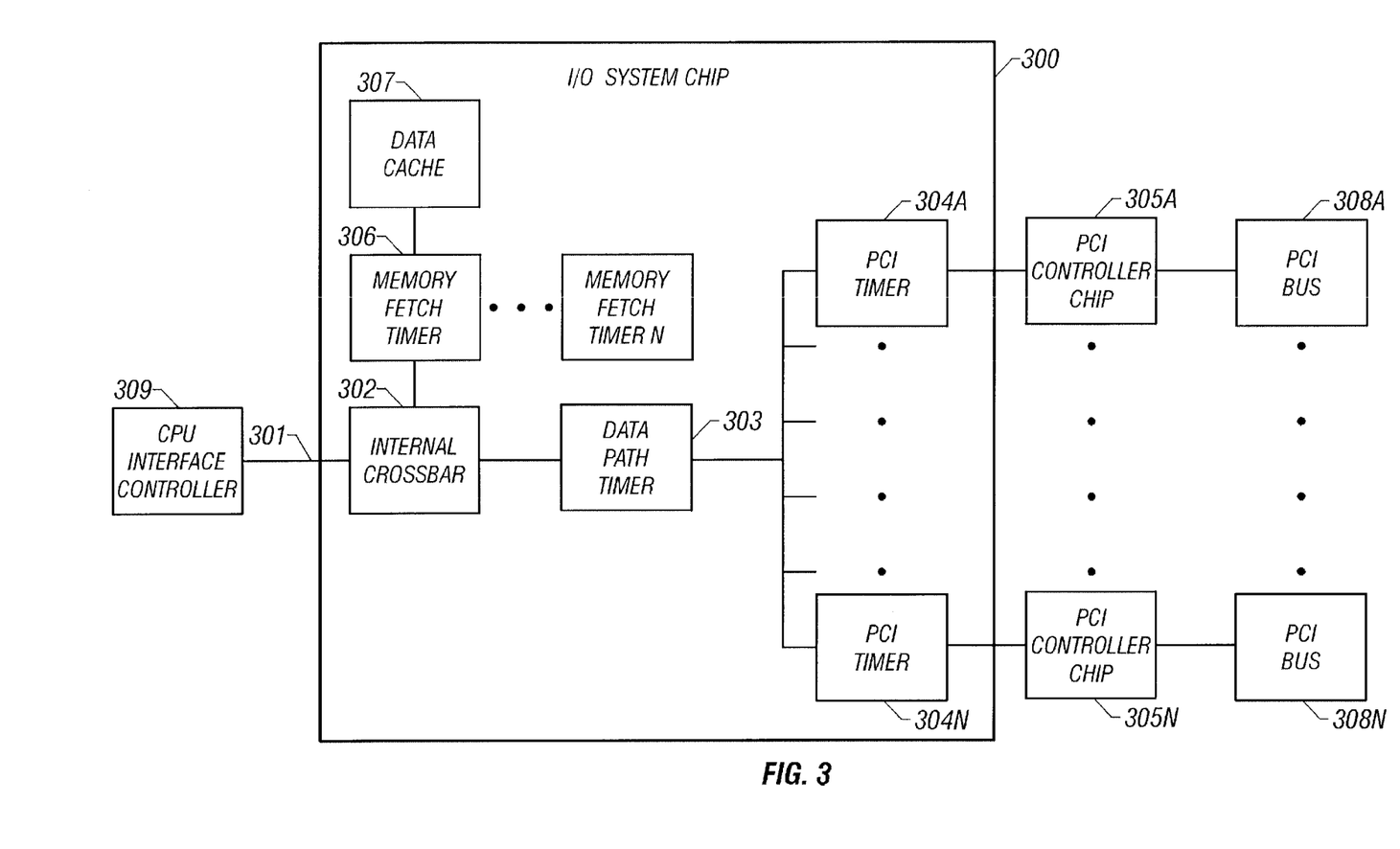
FIG. 3 depicts a distribution of counters within an input/output system chip according to a preferred embodiment of the present invention.

FIG. 3 depicts a distribution of counters within an input/output (I/O) system chip 300 according to a preferred embodiment of the present invention. The hierarchical timer arrangement of the present invention may be implemented on a range of different system chips. Whereas FIG. 2 depicted a deployment of the inventive mechanism on a CPU interface controller chip, FIG. 3 depicts one exemplary deployment of the inventive mechanism on an I/O system chip. In a preferred embodiment, I/O system chip 300 is substantially equivalent to I/O system chip 213 depicted in FIG. 2 and to "I/O" 101 depicted in FIG. 1.

In a preferred embodiment, when a fault condition is detected, which is preferably indicated by a time-out condition in one the timers within system chip 300, system chip 300 preferably proceeds to operate in a degraded mode until the fault is corrected. Preferably, during operation in the degraded mode, system chip 300 communicates its condition to other chips in the overall computer complex (not shown) to prevent communication delays in other parts of the complex and to thereby enable the remainder of the overall complex to operate unhindered. Preferably, upon detection of a fault condition, system 300 preferably causes recovery code to be executed to locate the cause of the fault condition and preserve data pertaining to the system state prior to occurrence of the fault condition.

In a preferred embodiment, system chip 300 is connected to CPU interface controller 309 via communication link 301. Preferably, CPU interface controller 309 is substantially equivalent to CPU interface controller 200 depicted in greater detail in FIG. 2. Within system chip 300, internal crossbar 302 preferably as a point to point communication interface between the various components of system chip 300 and between system chip 300 and external chips. System chip 300 preferably further includes data cache 307 for temporary data storage.

In a preferred embodiment, memory fetch timer 306 preferably operates to record the time required for accesses to memory by PCI (Peripheral Component Interconnect) controller chips 305A through 305N. It is noted that memory fetch timer 306 preferably performs a similar function to memory fetch timer 203 depicted in FIG. 2, except that timer 306 preferably performs a timing operation on behalf of the PCI controller chips whereas timer 203 in FIG. 2 preferably performs its timing operation on behalf of CPU 201. It will be appreciated that a plurality of memory fetch timers 306 may be included in the I/O system chip 300.

In a preferred embodiment, I/O system chip 300 operates to service requests for data from I/O cards (not shown) connected to PCI buses 308A to 308N. In an exemplary case, a request for data from an I/O card is transmitted along PCI bus 308A through PCI controller chip 305A toward internal crossbar 302, and ultimately, to data cache 307. If the requested data is present in data cache 307, system chip 300 preferably operates to transmit the requested data through internal crossbar 302 and back out along PCI bus 308A toward the requesting I/O card (not shown). If the requested data is not present in data cache 307, system chip 300 preferably issues a memory fetch in order to acquire the requested data and place this data into data cache 307. Where a memory fetch operation is necessary, memory fetch timer 306 preferably times the memory fetch operation and issues a time-out condition to system chip 300 if the memory fetch operation exceeds a pre-determined threshold.

In a preferred embodiment, where a CPU seeks data from an input device, CPU interface controller 309 transmits a read request to system chip 300. Preferably, this read request is transmitted through internal crossbar 302 and is then directed to an appropriate PCI controller chip. In an exemplary case, the read request would be directed to PCI controller chip 305A. PCI controller chip 305A then preferably operates to seek the requested data from PCI bus 308A and starts PCI timer 304A. PCI timer 304A preferably operates to ensure that the requested data is returned from PCI controller chip 305A within a pre-defined period. If the requested data is returned within a defined time period, timer 304A preferably times out and transmits an error condition to the requesting entity, which in this case, is CPU interface controller 309. In a preferred embodiment there are 12 each PCI timers, PCI controller chips, and PCI buses. It will be appreciated however, that fewer or more than 12 of each of the listed devices may be employed, and all such variations are included within the scope of the present invention. In the following, the combination of a PCI timer, PCI controller chip, and PCI bus in communication with one another is generally referred to as a "PCI equipment bundle."

In a preferred embodiment, PCI timers 304A through 304N operate to monitor requests for data sent to their respective PCI buses and transmit error conditions if defined time periods for the data requests elapse prior to satisfaction of the data requests. Preferably, once a particular PCI timer issues an error response to a requesting device, the PCI equipment bundle of which it is a part will not be accessed by the requestor until the error condition is resolved. However, the other PCI equipment bundles connected to system chip 300 preferably continue to operate unhindered. The inventive mechanism is thereby preferably able to beneficially isolate an error condition to a particular PCI equipment bundle while enabling the rest of system chip 300, the PCI equipment bundles which have not reported error conditions, and of course, the rest of the computer complex (not shown) to continue operating normally. Thus, whereas the system of FIG. 2 enabled the rest of the complex to continue operating while isolating an error condition to a single system chip, the system of FIG. 3 preferably further isolates the error condition thereby enabling the bulk of system chip 300 on which the error occurred, as well as the rest of the complex to continue operating normally.

In a preferred embodiment, an error response to a requesting device (which is likely a CPU) is sent in the form of fake data, which was described earlier in this specification. A CPU that receives the fake data return will then preferably run diagnostic software to gather information describing the fault condition and then determine appropriate remedial action.

In a preferred embodiment, data path timer 303 monitors data traffic into and out of internal crossbar 302 to detect whether any data bottlenecks occur. If data traffic between internal crossbar 302 and the rest of system chip 300 stalls, data path timer 303 will time out and cause system chip 300 to operate in a degraded mode until the error causing the data traffic stall is corrected. Recovery code is preferably executed upon determination that an error condition exists. While system chip 300 is operating in a degraded mode, system chip 300 will preferably transmit error condition indications to any chip attempting to communicate with system chip 300, thereby effectively isolating system chip 300 from the complex until full operation is restored to I/O system chip 300. In a preferred embodiment, data path timer 303 is preferably able to detect communication errors within I/O system chip 300 not identified by PCI timers 304A to 304N or by memory fetch timer 306. Although data path timer 303 is depicted as being positioned between internal crossbar 302 and PCI timers 304A to 304N, it will be appreciated that the data path timer 303 could be placed in number of other locations in the I/O system chip 300 and still operate to detect communication failures within I/O system chip 300.

While a selection of timer and device relationships have been discussed in connection with FIGS. 2, 2A through 2B, and 3, a number of other such relationships exist within the inventive mechanism. A selection of such other operations, associated time-out values, and formulae for determining the associated time-out values are presented in Table I below. It will be appreciated that the following table presents examples of timeout values and preferred equations for calculating time-out values for the various transactions listed in the table. It will be appreciated that the invention is not limited to the time-out values listed for the various transactions. It will be further appreciated that while the table identifies preferred formulae for calculating desirable time-out values for particular transactions, the invention is not limited to employing the formulae presented in the table. Furthermore, Table I is intended to present an illustrative list of transactions suitable for timing. Transactions other than those listed in Table I may be timed and monitored employing the inventive principles disclosed herein, and all such variations are included within the scope of the present invention.

TABLE I

Timeout Hierarchy Spreadsheet Transactions

| | Timeout Value (mS) | Formula |
|---|---|---|
| Internal memory FIFO | 0.01 | 10 uSec |
| Internal memory forward progress | 0.02 | 20 uSec |
| I/O Subsystem response | 0.05 | Estimate based on queue depth calculatio |
| CPU response | 0.10 | Value given by CPU designers for maximum snoop response time. |
| Snoop Response Forward Progress | 0.13 | Determined based on calculations of memory bandwidth (the rate at which memory can service transactions). |
| PDH forward progress | 0.50 | Estimated max response time |
| I/O Subsystem Internal forward progress | 5.00 | Determined from maximum PCI response time. |
| I/O Subsystem times I/O card | 2.00 | Determined from maximum PCI response time. |
| Snoop/Data progress | 6.10 | CPU response + 6 mS |
| Memory snoop response progress | 10.10 | CPU response + 10 mS |
| Memory Fetch forward progress | 12.10 | Memory snoop response + 2 mS |
| I/O Subsystem fetch response time | 14.10 | Memory snoop response + 2 mS |
| I/O subsystem register read/write response | 30.20 | 2 × (I/O Subsystem fetch response) + 2 m |
| Register read/write progress | 31.20 | I/O subsystem register read/write + 1 mS |
| CPU memory fetch response time | 12.10 | Memory snoop response + 2 mS |
| CPU register read/write response time | 32.20 | I/O subsystem register read/write + 2 mS |
| CPU Purge TLB time | 34.20 | CPU register read/write response + 2 mS |
| CPU Internal Timeout | 72.40 | 2 × (CPU Purge TLB time) + 4 mS |
| Deadlock Recovery | 148.80 | 2 × (CPU Internal Timeout) + 4 mS |

With reference to the table above, FIFO refers to First-In, First-Out, CPU purge TLB refers to the CPU's Purge Translation Buffer timer. The "CPU purge TLB time" refers to the value provided by CPU designers for maximum purge translation buffer response time. PDH refers to Processor Dependent Hardware. "Forward progress" timers preferably ensure that traffic flows freely and that transactions continue to make progress. "Estimate based on queue depth calculation" generally refers to a time value determined from a detailed analysis of transactions traveling through the data path queues throughout the example system. The "Deadlock recovery" timer is generally a forward progress timer on the internal crossbar switch of CPU interface controller 200.

Figure 4:
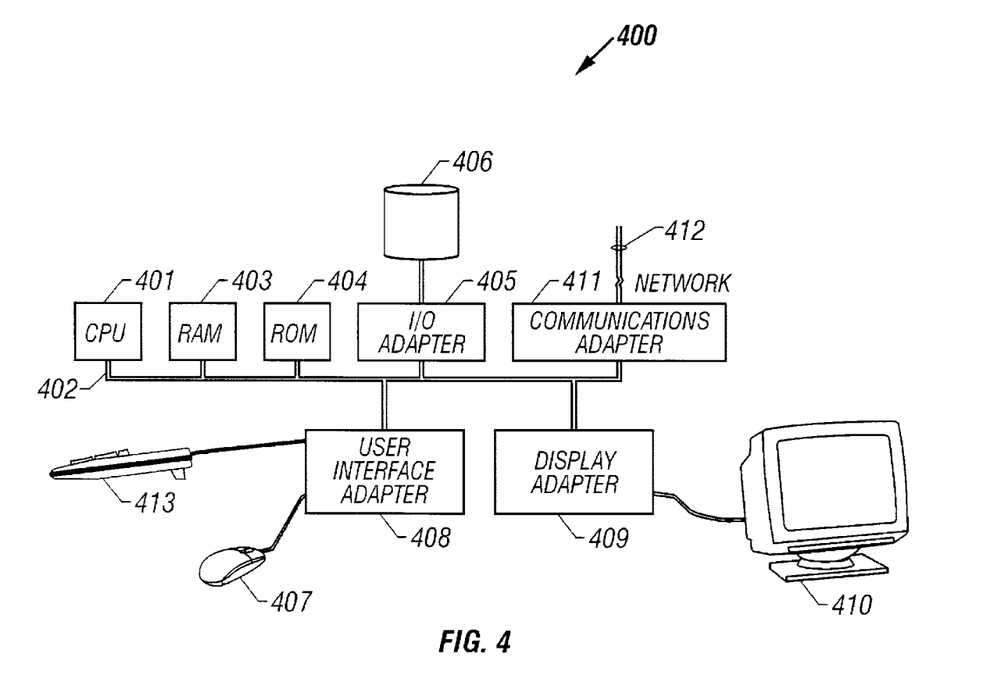
FIG. 4 depicts data processing equipment adaptable for use with a preferred embodiment of the present invention.

FIG. 4 illustrates a computer system 400 adaptable for use with a preferred embodiment of the present invention. Central processing unit (CPU) 401 is coupled to system bus 402. The CPU 401 may be any general purpose CPU, such as an HP PA-8200. However, the present invention is not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

The bus 402 is also coupled to input/output (I/O) adapter 405, communications adapter card 411, user interface adapter 408, and display adapter 409. The I/O adapter 405 connects to storage devices 406, such as one or more of hard drive, CD drive, floppy disk drive, tape drive, to the computer system. Communications adapter 411 is adapted to couple the computer system 400 to a network 412, which may be one or more of local (LAN), wide-area (WAN), Ethernet or Internet network. User interface adapter 408 couples user input devices, such as keyboard 413 and pointing device 407, to the computer system 400. The display adapter 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for isolating a fault condition in a complex of computing devices, the method comprising the steps of:
    establishing a hierarchy of transactions executed within said complex;
    monitoring at least one transaction of said transactions with a transaction-specific timer, wherein each said transaction-specific timer has an expiration time, thereby establishing a hierarchy of timers and a hierarchy of expiration times corresponding to said hierarchy of transactions;
    setting said expiration times of said transaction-specific timers to progressively higher values at progressively higher levels of said hierarchy of timers; and
    upon expiration of a transaction-specific timer, transmitting a time-out condition to a next higher level timer in said hierarchy of timers, thereby indicating a fault condition within a component of said complex including said expired timer, wherein said component is a faulty component.

2. The method of claim 1 comprising the further step of:
    halting said next higher level timer prior to an expiration of said next higher level timer.

3. The method of claim 1 comprising the further step of:
    operating said faulty component in a degraded mode until said fault condition is corrected.

4. The method of claim 1 comprising the further step of:
    indicating a fault condition at said faulty component to at least one other component in said complex.

5. The method of claim 4 comprising the further step of:
    causing said at least one other component in said complex to avoid communication with said faulty component until said fault condition is corrected, thereby operating to isolate said fault condition to said faulty component and enabling a remainder of said complex to continue operating.

6. The method of claim 1 further comprising the steps of:
    logging error information describing said fault condition; and
    executing recovery code within said faulty component upon identification of a fault condition employing said logged error information.

7. The method of claim 1 wherein said faulty component is a central processing unit.

8. The method of claim 1 wherein said faulty component is a system chip.

9. The method of claim 1 wherein said faulty component is a subset of a system chip.

10. The method of claim 1 further comprising the step of:
    monitoring a highest level transaction of said hierarchy of transactions with a central processing unit.

11. A system for preserving an operation of a distributed computing complex during a fault condition, the system comprising:
    a plurality of devices operating within a first functional component of said complex;
    a sequence of transactions executed in said first functional component linking a plurality of said plurality of devices, wherein the sequence has a first transaction and a last transaction;
    a plurality of timers in communication with at least one of said plurality of devices for timing at least one of said sequence of transactions;
    means for setting expiration values of said plurality of timers to progressively lower levels for timers of said plurality of timers timing transactions in increasing proximity to said last transaction, thereby establishing a hierarchy of timers and a hierarchy of expiration values;
    means for transmitting a time-out condition to a next higher level timer of said plurality of timers upon expiration of a timer of said plurality of timers;
    means for logging an error at said higher level timer, thereby identifying a fault condition within said first functional component of said complex;
    means for informing other functional components of said complex of said fault condition in said first functional component of said complex, thereby avoiding propagation of said fault condition to said other functional components of said complex and preserving the operation of said complex during said fault condition.

12. The system of claim 11 further comprising:
    means for operating said first functional component in a degraded mode until said fault condition is corrected.

13. The system of claim 11 further comprising:
    means for executing recovery code in said first functional component in response to a fault condition to identify and correct a cause of said fault condition.

14. The system of claim 11 further comprising:
    at least one timer of said plurality of timers implemented in software.

15. The system of claim 11, further comprising:
at least one timer of said plurality of timers implemented in hardware.

16. A computer program product having a computer readable medium having computer program logic recorded thereon for isolating a fault condition in a complex of computing devices, the computer program product comprising:
code for establishing a hierarchy of transactions executed within said complex;
code for monitoring at least one transaction of said transactions with a transaction-specific timer, wherein each said transaction-specific timer has an expiration time, thereby establishing a hierarchy of timers and a hierarchy of expiration times corresponding to said hierarchy of transactions;
code for setting said expiration times of said transaction-specific timers to progressively higher values at progressively higher levels of said hierarchy of timers; and
code for transmitting a time-out condition to a next higher level timer in said hierarchy of timers upon expiration of a transaction-specific timer, thereby indicating a fault condition within a component of said complex including said expired timer, wherein said component is a faulty component.

17. The computer program product of claim 16 further comprising:
code for halting said next higher level timer prior to an expiration of said next higher level timer.

18. The computer program product of claim 16 further comprising:
code for operating said faulty component in a degraded mode until said fault condition is corrected.

19. The computer program product of claim 16 further comprising:
code for logging error information describing said fault condition; and
code for executing recovery code within said faulty component upon identification of a fault condition employing said logged error information.

20. The computer program product of claim 19 further comprising:
code for causing at least one other component in said complex to avoid communication with said faulty component until said fault condition is corrected, thereby operating to isolate said fault condition to said faulty component and enabling a remainder of said complex to continue operating.

\* \* \* \* \*